A. D. CATLIN.
VALVE MECHANISM.
APPLICATION FILED DEC. 23, 1909.

992,161.

Patented May 16, 1911.

2 SHEETS—SHEET 1.

Attest.
Bent. M. Stahl.
Ewd L. Tolson.

Inventor.
Abel D. Catlin.
by Spear, Middleton, Donaldson & Spear
Attys.

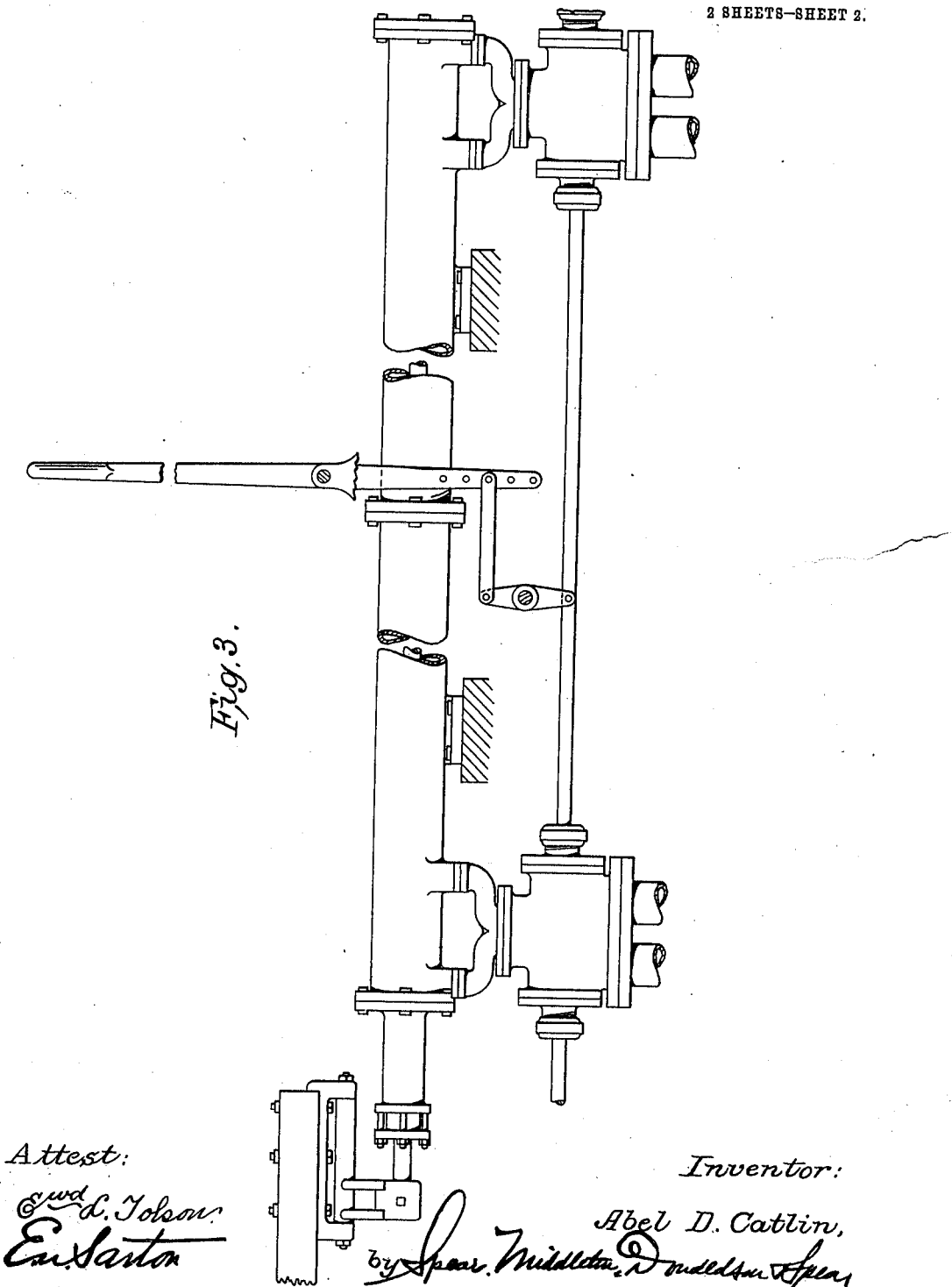

UNITED STATES PATENT OFFICE.

ABEL D. CATLIN, OF CHATTANOOGA, TENNESSEE.

VALVE MECHANISM.

992,161. Specification of Letters Patent. Patented May 16, 1911.

Application filed December 23, 1909. Serial No. 534,700.

*To all whom it may concern:*

Be it known that I, ABEL D. CATLIN, citizen of the United States, residing at Chattanooga, Tennessee, have invented certain new and useful Improvements in Valve Mechanism, of which the following is a specification.

My invention relates to valve mechanism, and is particularly designed for use in connection with cylinders and pistons employed for operating saw mill carriages, and it includes the features and combination and arrangement of parts hereinafter described and particularly pointed out in the claims.

Figure 1:
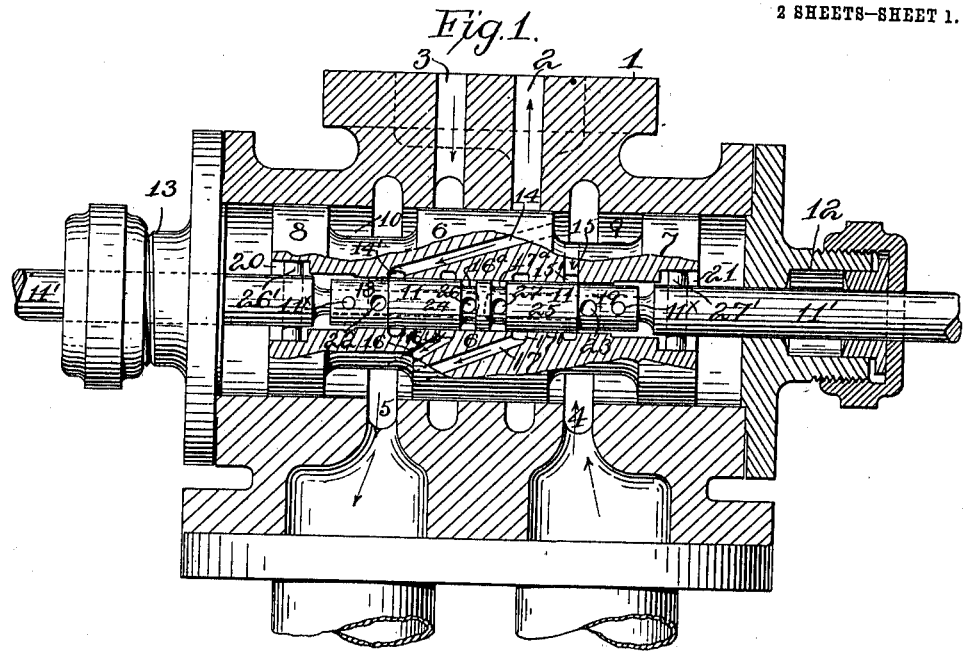
Figure 2:
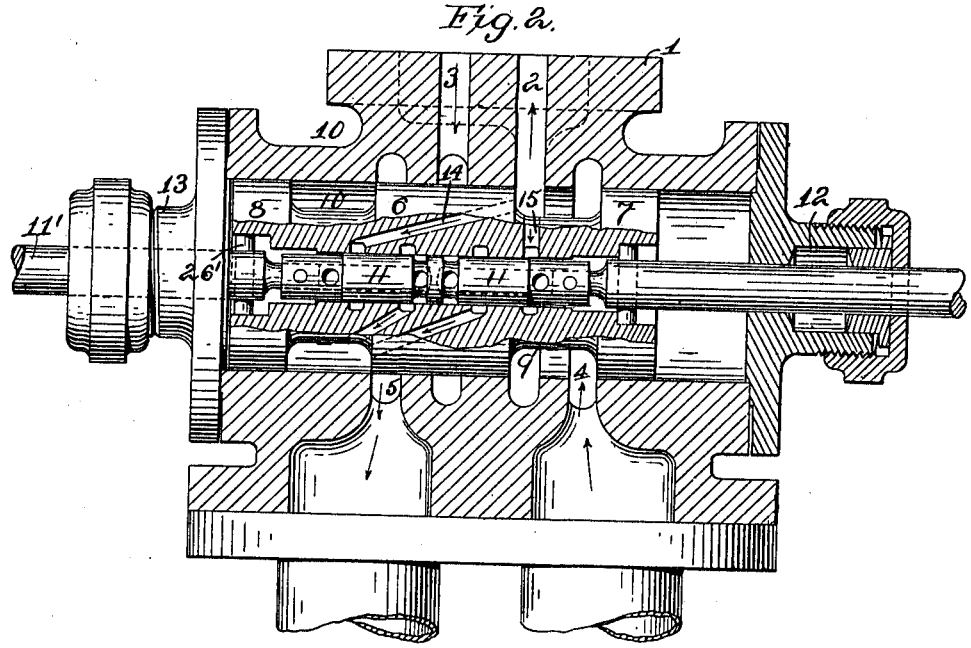

In the accompanying drawing: Figure 1 is a view of the valve in its neutral position, and Fig. 2 is a similar view of the valve at the limit of its movement in one direction. Fig. 3 is a view of a part of a saw mill carriage with the cylinder and piston connection and with a pair of my valves connected with the cylinder.

In valve mechanism of the class to which my improvement belongs, it is customary to operate the valve by hand for supplying the motive fluid to the end of the cylinder or exhausting it therefrom in operating the saw mill carriage, and it has been the practice to exert this manual control of the hand lever by pressure thereon throughout the stroke of the valve. This imposes considerable labor on the part of the operator, which my invention is designed to avoid.

The valve casing is indicated at 1 having a passage 2 leading into the cylinder of the engine (not shown), and a passage 3 leading from said cylinder to the interior of the valve casing. These passages are arranged about centrally of the length of the valve casing. To one side of these passages a live steam passage 4 leads into the valve casing, and on the left a passage 5 extends from the interior of the valve casing for the escape of the exhaust steam.

The valve proper is of cylindrical form, and consists of a central portion 6 and two end rings 7, 8, arranged at a distance from the main portion, leaving intervening annular spaces 9 and 10.

Within the main valve and axially in respect thereto is fitted a pilot or supplemental valve 11, also of cylindrical form, the stem of which passes to the outside through stuffing boxes 12, 13, at the ends of the valve casing.

A pair of supply passages or steam inlets 14, 15, extend through the main valve from the annular steam space 9 to its axial bore, where the pilot valve is arranged to slide, at which point said inlets connect with annular grooves 14', 15' in the main valve to direct the steam to the pilot valve to be controlled thereby in respect to supplying it to or cutting it off from the ends of the main valve.

The main valve is also provided with exhaust passages 16, 17, leading from annular grooves 16', 17', opening from the center bore of the main valve, the other ends of the said exhaust passages connecting with the space 10 and at times with the main exhaust passage 5. The annular exhaust grooves 16', 17' are formed equidistant on opposite sides of the center of the main valve 6, and at greater distances the inlet grooves 14', 15', are formed, these also being equidistant from the center of the valve.

The ends of the pilot valve are reduced providing annular passages 18, 19, leading to the opposite ends of the main valve through enlarged portions 20, 21, at the end of the internal bore of the main valve. Exhaust ports 22, 23 are formed in the reduced ends of this pilot valve, which connect with longitudinally extending passages 24, 25, connecting with ports 26, 27, opening into annular exhaust grooves 16$^a$, 17$^a$ arranged near the center of the pilot valve, and adapted to connect respectively with the exhaust passages 16' and 17', one at a time.

With the above construction and supposing the main and pilot valves to be in the neutral position of Fig. 1 with all the passages closed, the operation will be as follows:

The attendant, through a suitable hand lever or other device connected with the stem 11' of the pilot valve, moves the said valve, we will say, to the left. As soon as the reduced part at the right hand end of the pilot valve registers with the inlet port 15, of the main valve, the fluid pressure will pass to the right hand end of the main valve from the main inlet 4, the space 9, the said port or passage 15, the crevice 19 and the enlarged space 21, and the main valve will begin to move leftward. If the attendant keeps the pilot valve moving continuously toward the left so as to keep the ports and passages just mentioned open, the leftward movement of the main valve will also continue, but if at any time the attendant stops moving the pilot valve, then the movement of the main valve will continue only until the passage 15 of the main valve comes over the intact surface of the pilot valve of full diameter, which will cut off the entrance of further fluid pressure through the port 15, and the movement of the main valve will cease.

When the main valve has moved to the left sufficiently far to make its space 9 register with the main inlet port 2 leading to the main cylinder of the engine, fluid pressure will be admitted to the said main cylinder to operate the piston therein. During this leftward movement of the pilot and main valves, the other inlet passage 14 through the main valve will remain closed, but any fluid pressure at the left hand end of the main valve will be free to escape through the space 20 and the crevice or passage 18 at the left of the main and pilot valves, the exhaust port 22 and passage 24 of the pilot valve, the port 26, annular exhaust groove 16ª, the exhaust passages 16' 16 of the main valve, and the main exhaust 5.

The movement of the pilot valve in relation to the main valve is limited by pins 26', 27', on the pilot valve striking the end surfaces of the main valve within the recesses 20, 21 therein. The relative positions of the main and pilot valves when the pilot valve is moved leftward as above described, is illustrated in Fig. 2, and this view also represents the main valve at the limit of its leftward stroke at which time the main inlet port 2 leading to the engine cylinder is in wide open communication with the space 9 of the main valve, and through this with the main inlet passage 4, and the exhaust port 3 from the engine is cut off from communication with the main outlet 5, through the space 10 of the main valve. Now, by moving the pilot valve toward the right, similar operations to those above described will take place, the fluid pressure reaching the left hand end of the casing through the main inlet port 4, space 9, inlet passage 14 of the main valve, annular passage 18, and space 20, the inlet 15 of the main valve being closed by the movement of the pilot valve, and the exhaust from the right hand end of the main valve will take place through the space 21, the annular passage or crevice 19, the pilot ports, and passages 23, 25 and 27, and thence through the other exhaust passage 17 in the main valve to the exhaust port 5. The main valve will now be driven toward the right, thus opening the exhaust port 3 leading from the cylinder to the space 10 of the main valve, and thence to the exhaust port 5 of the said valve casing. The stems of the pilot valve are connected thereto by the pins 11ˣ.

Fig. 3 shows the cylinder associated with a part of a saw mill carriage and having one of my piston valves, as above described, connected therewith at each end. It will be observed that there is an inlet and an outlet passage between the cylinder and the valve casing at each end thereof.

I claim:—

1. In valve mechanism of the class described, the combination of a casing having a single main inlet 2, 4, and a single main outlet 3, 5, a main valve having an inlet space 9 and an outlet space 10, a pair of inlet passages connecting with the inlet space 9, one for each end of the main casing, said main valve having also a pair of outlet passages, one for each end of the main casing and connecting with the outlet space 10, and a central pilot valve having means for controlling the said inlet and outlet passages of the main valve to connect the same with the ends of the main valve for the inlet or outlet of the fluid, substantially as described.

2. In valve mechanism of the class described, a valve casing having inlet and exhaust ports, a main valve therein having inlet and outlet spaces to connect with said ports, and having a pair of inlet passages 14 and 15 connecting with the inlet space of the main valve, and exhaust passages 16 and 17 to connect with the outlet space of said valve, and a reciprocatory pilot valve extending longitudinally of the main valve, and controlling said passages, substantially as described.

3. In combination the main valve having inlet and outlet spaces disposed near its ends having also the two inlet passages leading from the inlet space to its interior bore on opposite sides of the middle of the valve, and having two outlet passages leading from said central bore on opposite sides of the middle of the valve, and connecting with the outlet space of the valve, and a reciprocatory pilot valve operating in the interior bore of the main valve and controlling the passages therethrough, a valve casing, and inlet and outlet passages therein to register with the inlet and exhaust spaces of the main valve, substantially as described.

4. In combination the main valve having inlet and outlet spaces disposed near its ends having also the two inlet passages leading from the inlet space to its interior bore on opposite sides of the middle of the valve, and having two outlet passages leading from said central bore on opposite sides of the middle of the valve, and connecting with the outlet space of the valve, and a reciprocatory pilot valve operating in the interior bore of the main valve and controlling the passages therethrough, a valve casing, and inlet and outlet passages therein to register with the inlet and exhaust spaces of the main valve, said pilot valve having longitudinally extending exhaust passages therethrough, substantially as described.

5. In combination the main valve having inlet and outlet spaces disposed near its ends having also the two inlet passages leading from the inlet space to its interior bore on opposite sides of the middle of the valve, and having two outlet passages leading from said central bore on opposite sides of the middle of the valve, and connecting with the outlet space of the valve, and a reciprocatory pilot valve operating in the interior bore of the main valve, and controlling the passages therein to register with the inlet and exhaust spaces of the main valve, said pilot valve having longitudinally extending exhaust passages therethrough, and having also reduced ends forming with the wall of the interior bore of the main valve passages leading to the ends of the main valve, substantially as described.

6. In combination in a valve mechanism of the class described, a valve casing having inlet and exhaust ports, a main valve to reciprocate therein having annular inlet and exhaust passages near its opposite ends, and an internal bore, inlet passages leading from the inlet space of the main valve to the central bore on opposite sides of the middle thereof and opening into annular grooves, exhaust passages leading from annular grooves on opposite sides of the middle and at the interior bore of the main valve through the main valve to the annular outlet space of the main valve, a pilot valve arranged axially of the main valve to move longitudinally thereof, and having annular grooves on opposite sides of its center to connect with the exhaust passages through the main valve, longitudinally extending passages in the pilot valve connecting said grooves with the spaces at the ends of the main valve within the casing, said pilot valve controlling the communication between the inlet passage of the main valve and the ends of the valve casing, substantially as described.

7. In combination with a saw mill carriage, a cylinder, a valve casing at each end of the cylinder, each casing having a passage leading therefrom into the cylinder and a passage leading from said cylinder to the interior of the valve casing and a live steam passage leading into the valve casing and an exhaust steam passage leading from the said casing and a piston valve in each casing controlling the said passages with a rod for operating the said piston valve, substantially as described.

In testimony whereof, I affix my signature in presence of two witnesses.

ABEL D. CATLIN.

Witnesses:
E. DeL. WOOD,
M. V. MINOR.